United States Patent [19]

Raab

[11] Patent Number: 4,645,054

[45] Date of Patent: Feb. 24, 1987

[54] TORSIONAL VIBRATION DAMPER WITH SMOOTH TRANSITION BETWEEN TWO SPRING SYSTEMS

[76] Inventor: Harald Raab, Schweinfurt, Fed. Rep. of Germany

[21] Appl. No.: 707,468

[22] Filed: Mar. 1, 1985

[30] Foreign Application Priority Data

Mar. 1, 1984 [DE] Fed. Rep. of Germany ....... 3407524

[51] Int. Cl.⁴ .............................................. F16D 3/12
[52] U.S. Cl. .................................. 192/106.2; 464/68
[58] Field of Search ............... 192/106.1, 106.2, 70.17; 464/63, 68

[56] References Cited

U.S. PATENT DOCUMENTS

| | | | |
|---|---|---|---|
| 3,414,101 | 12/1968 | Binder et al. ..................... | 192/106.2 |
| 4,471,863 | 12/1984 | Lech, Jr. ........................... | 192/106.2 |
| 4,560,054 | 12/1985 | Kayanoki et al. ................. | 464/68 X |

FOREIGN PATENT DOCUMENTS

| | | |
|---|---|---|
| 1801969 | 4/1972 | Fed. Rep. of Germany . |
| 2098702 | 11/1982 | United Kingdom ................. 464/68 |
| 2120358 | 11/1983 | United Kingdom . |

*Primary Examiner*—George H. Krizmanich
*Attorney, Agent, or Firm*—Toren, McGeady and Goldberg

[57] ABSTRACT

According to an example embodiment of this invention, a clutch disc comprises a primary hub, a seconday hub and a lining carrier. The primary hub is angularly movable with respect to the secondary hub and the secondary hub is angularly movable with respect to the lining carrier. First load transmitting springs are provided between the primary hub and the secondary hub. Second load transmitting springs are provided between the secondary hub and the lining carrier. The second springs have a steeper spring characteristic than the first springs. Abutments are provided on both the primary hub and the secondary hub. The second springs are pre-stressed. When an increasing load is transmitted the angular movement of the secondary hub with respect to the lining carrier begins before the abutments of the primary and the secondary hubs engage each other.

8 Claims, 8 Drawing Figures

TORSIONAL VIBRATION DAMPER WITH SMOOTH TRANSITION BETWEEN TWO SPRING SYSTEMS

BACKGROUND OF THE INVENTION

The invention relates to a torsional vibration damper, especially for clutch discs of motor vehicles, consisting inter alia of at least two spring systems having different spring characteristic curves, in which in the transition from the spring system with the less steep spring characteristic curve to the spring system with the steeper spring characteristic curve the system with the less steep spring characteristic curve is bridged over by stops and at least some torsion springs of the spring system with the steeper spring characteristic curve are installed under pre-stress.

STATEMENT OF THE PRIOR ART

From German Patent Specification No. 1,801,969 a torsional vibration damper is known in which a two-part hub with toothing is provided, the two toothings engaging in one another with play in the circumferential direction. Springs having a flat characteristic spring curve are arranged between the two parts of the toothing. A further set of springs with a steeper spring characteristic curve comes into use when the play between the two toothings is used up. It is usual here to arrange at least one of the springs of the spring system with the steeper spring characteristic curve so that they are inserted in the circumferential direction with pre-stress into the windows of the corresponding components, in order to avoid chattering noises and wear at this point. Now when the spring system with the steeper characteristic curve comes into action the spring pre-stress leads to a point of unsteadiness in the course of the characteristic curve and thus also to noise generation in the transit of this zone.

OBJECT OF THE INVENTION

It is a main object of the present invention to improve the known torsional vibration damper such that the chattering noises resulting from the transition between the two sets of springs can be eliminated, and this with minimum possible expense.

SUMMARY OF THE INVENTION

In view of the above object a torsional vibration damper of this invention, especially for clutch discs of motor vehicles comprises at least two spring systems with different spring characteristic curves. In the transition from the spring system with the less steep spring characteristic curve to the spring system with the steeper spring characteristic curve the system with the less steep spring characteristic curve is bridged over by stops. At least some torsion springs of the spring system with the steeper spring characteristic curve are installed under pre-stress. The abutment torque of the spring system with the less steep spring characteristic curve (i.e. the torque exerted by this system on abutment of the stops) is made by design equal to or greater than the pre-stress torque of the spring system with the steeper spring characteristic curve (i.e. the torque which is exerted by the pre-stressed springs in the zero-load condition). Due to the increase of the abutment torque of the spring system with the less steep spring characteristic curve to a value equal to or greater than the pre-stress torque of the spring system with the steeper spring characteristic curve the unsteadiness as objected above can be eliminated completely. In this case in a mixed zone the two spring systems work in series, whereby firstly a slightly less steep spring characteristic curve is achieved in this mixed zone than in the zone with the less steep spring characteristic curve, and also the travel of the spring system with the less steep spring characteristic curve is enlarged by a specific amount. The otherwise usual unsteadiness is thus completely avoided practically without additional expense.

It is further proposed that in the spring system with the steeper spring characteristic curve, which comprises a parallel-acting friction device, the above-defined abutment torque of the spring system with the less steep spring characteristic curve is made by design equal to or greater than the sum of the pre-stress torque as defined above and the friction torque (i.e. the torque exerted by the friction device). In this case, where a friction torque is superimposed upon the steeper spring characteristic curve, it is likewise possible by appropriate increase of the abutment torque as defined above of the spring system with the less steep spring characteristic curve to avoid an unsteadiness.

In a clutch disc having a two-part hub and a toothing with play in the circumferential direction between the two hub parts, where the angle of rotation of the idling system is determined by the play between the two toothings, it is proposed in accordance with the present invention to form the spring system for the idling system so that two different sets of springs come into action in succession and thus an angled spring characteristic is achieved in the idling range. So only in the second zone of the idling system an abutment torque is achieved which is made by design equal to or greater than the sum of the pre-stress torque and the frictional torque of the under-load system.

According to another aspect of the invention, a vibration-damped load-transmitting rotor system comprises a first rotor member, a second rotor member and a third rotor member rotatable with respect to each other about a common axis of rotation. The first rotor member has a zero-load angular relative position with respect to the second rotor member, and the second rotor member has a zero-load relative angular position with respect to the third rotor member. Cooperating abutment means are provided on the first rotor member and the second rotor member. These abutment means define in abutment condition an abutment-defined angular relative position of the first rotor member and the second rotor member. First load-transmitting spring means are provided between the first rotor member and the second rotor member. Second load-transmitting spring means are provided between the second rotor member and the third rotor member. The second load transmitting spring means are pre-stressed such as to supply a pre-stress transmission torque value in the zero-load relative angular position of the second rotor member and the third rotor member. The first load-transmitting spring means supply an increasing transmission torque in response to the first and the second rotor members approaching the abutment-defined angular relative position under a circumferential load applied to the first and the third rotor members. The second load-transmitting spring means supply an increasing transmission torque beyond the pre-stress transmission torque value in response to the second and third rotor members being rotated with respect to each other beyond their zero-load relative angular position under a circumferential load applied to the first and the third rotor members. The increase of transmission torque per unit of angular movement of the respective rotor members is smaller for the first load-transmitting spring means than for the second load-transmitting spring means. The transmission torque supplied by the first load-transmitting spring means becomes equal to the pre-stress transmission torque value when or before the abutment means enter into abutting condition.

According to a further development of this invention, cooperating frictional damping means are provided on the second rotor member and the third rotor member. These frictional damping means supply a frictional torque value resisting to relative angular movement of the second and the third rotor members. In this case, the advantages of the invention are achieved when the transmission torque supplied by the first load-transmitting spring means becomes equal to the sum of the pre-stress transmission torque value and the frictional torque value when or before the abutment means enter into abutting condition.

According to a still further development of the invention, the first load-transmitting spring means comprise at least two spring units. One of these spring units is stressed only in a section of angular relative movement of the first rotor member and the second rotor member, which section is angularly spaced from the zero-load relative angular position towards the abutment-defined angular relative position of the first and the second rotor members.

The first rotor member may be a primary hub member of a clutch disc unit and the second rotor member may be a secondary hub member of a clutch disc unit. The third rotor member may be a friction lining carrier of the clutch disc unit. In this case, the abutment means may be defined by toothings of the primary hub member and the secondary hub member, which toothings permit a circumferential play of the primary hub member and the secondary hub member.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiments of the invention.

BRIEF DESCRIPTION OF THE DRAWING

The invention will be explained in greater detail below by reference to some examples of embodiments illustrated in the drawings, wherein.

DESCRIPTION OF THE PREFERRED EMBODIMENTS

Figure 1:
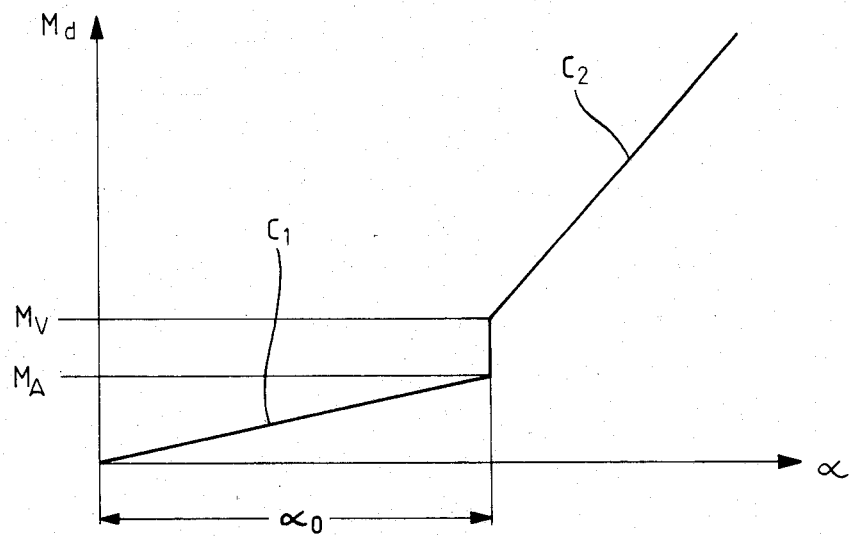
FIG. 1 shows a spring characteristic curve according to the prior art.

FIG. 1 shows the representation of principle of a spring characteristic curve of a torsional vibration damper of the prior art in which $\alpha$ is the angular relative movement of the input member (first rotor member) and the output member (third rotor member) and $M_d$ is the torque applied by a load to be transmitted during such angular movement. Such a torsional vibration damper can be arranged in a clutch disc such as appears by way of example from the section according to FIG. 7, which will be described in detail in due course hereinafter. $C_1$ designates the flat spring characteristic curve of the idling system, which ordinarily passes through the zero point in the co-ordinate system as represented. The maximum angle of rotation of the idling spring system with the flat spring characteristic curve is pre-determined by the angle $\alpha_0$ by appropriate stops within the torsional vibration damper. Under control by these stops, next a spring system with a steeper spring characteristic curve according to $C_2$ is set into action. The springs of this latter spring system are held without play in the circumferential direction in appropriate windows with a selected pre-stress, and the pre-stress effects a pre-stress transmission torque value $M_V$ which is greater than the abutment torque value $M_A$ of the spring system with the less steep spring characteristic curve $C_1$ (the abutment torque value is the transmission torque supplied by the spring system with the less steep spring characteristic when the stops engage each other). The jump of torque of the magnitude $M_V - M_A$ occurring after the travelling of the angle $\alpha_0$ effects abutment noises on every passage through this range.

Figure 2:
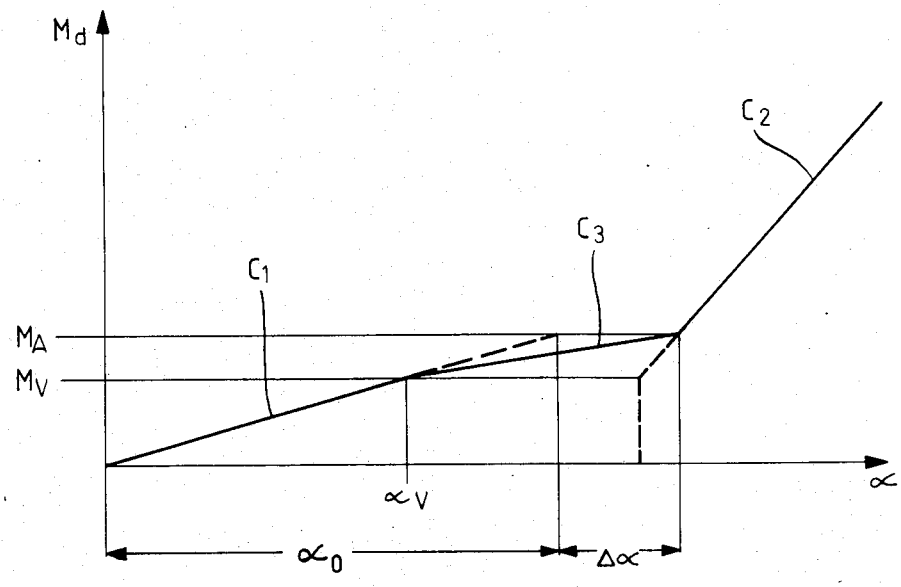
FIG. 2 shows a spring characteristic curve according to the invention.

The course of the spring characteristic curve according to the present invention is illustrated in FIG. 2. The flat spring characteristic curve with the spring constant $C_1$ passes through the zero point. The steeper spring characteristic curve with the spring constant $C_2$ comes into effect at a torque corresponding to the value $M_V$, the pre-stress transmission torque value of the springs with the steeper spring characteristic curve $C_2$. After the angle $\alpha_v$ has been travelled the transmission torque of the spring system with the flat spring characteristic curve $C_1$ achieves the value $M_V$ and that signifies that from this rotation angle onwards, on further torque loading both spring systems are in action in series connection. Thus in a mixed zone a spring characteristic curve $C_3$ results which has a somewhat less steep course than the spring characteristic curve $C_1$. The pre-determined rotation angle according to the angle $\alpha_0$ between the zero-load angular position and the abutment-defined angular position of the spring system with the flat spring characteristic curve is increased by the value $\Delta\alpha$ by additional angular movement of the spring system with the steep spring characteristic curve according to $C_2$. Only after $\alpha_0 + \Delta\alpha$ has been travelled the stops come into engagement and now the spring system with the steeper spring characteristic curve according to $C_2$ only is still effective.

It can easily be understood that with such a course of the spring characteristic curves, compared with the illustration in FIG. 1, a more uniform transition can be achieved on increase of the load.

The conditions are somewhat more complicated when the steeper spring characteristic curve is superimposed by the effect of a friction device. This case is however to be encountered especially frequently in practice. The resultant relationships are reproduced in FIG. 3. Three different points on the curve according to FIG. 3, namely the points $\overline{4}$, $\overline{5}$ and $\overline{6}$, correspond respectively to the diagrammatic illustrations according to FIGS. 4, 5 and 6. These each show a spring 14 of the spring system with the flat spring characteristic curve $C_1$ and a spring 6 of the spring system with the steep spring characteristic curve $C_2$. The hub 7 (primary hub—see e.g. FIG. 7) has a profile which co-operates with the hub disc 8 (secondary hub). The angular play between the hub 7 and the hub disc 8 is $\alpha_0$. The torsion spring 6 of the spring system with the steeper spring characteristic curve $C_2$ is arranged between the hub disc 8 and the cover plates 4 and 5 (lining carrier—see e.g. FIG. 7). The spring 6 is held at a pre-stress transmission torque value by means of the bracket 17. The two arrows by the hub 7 and the cover plates 4 and 5 symbolize the torque loading and the transmission torque within the clutch disc. A friction device 10 is arranged between the hub disc 8 and the cover plates 4 and 5.

Figure 3:
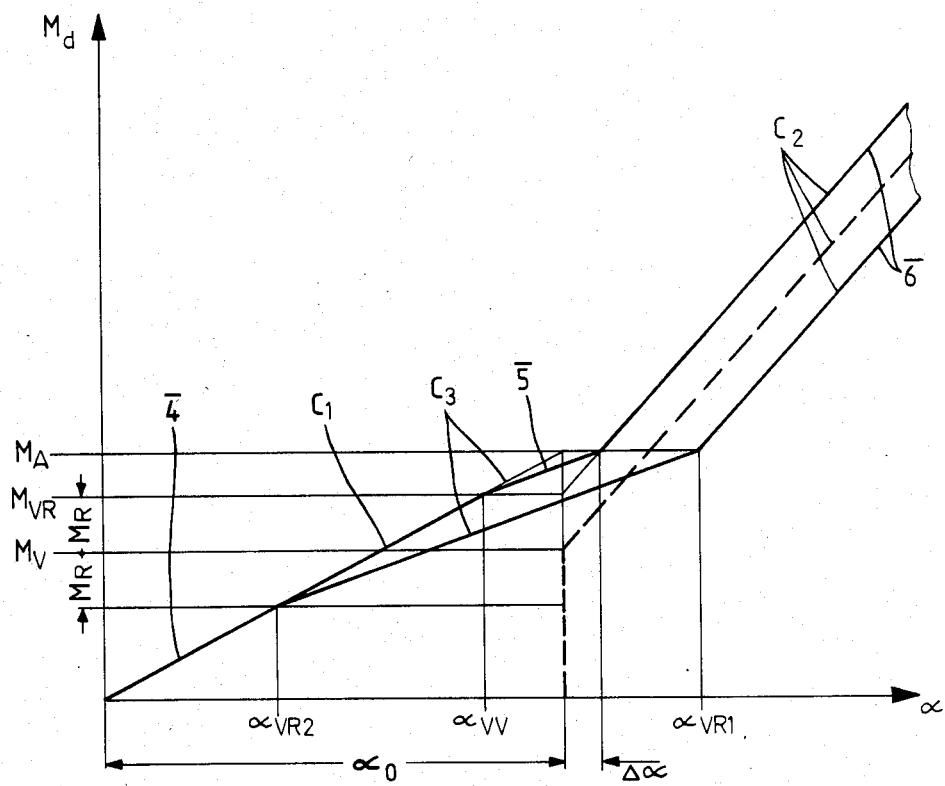
FIG. 3 shows a spring characteristic curve taking consideration of a friction device.
Figure 4:
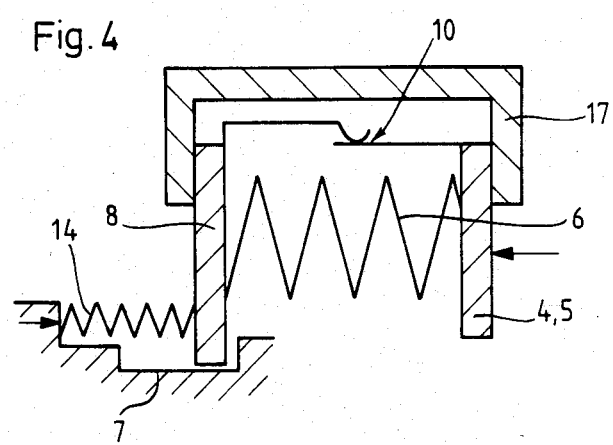
FIGS. 4, 5 and 6 show diagrammatic representations of principle of the arrangement of two different spring systems to achieve a spring characteristic curve according to FIG. 3.
Figure 5:
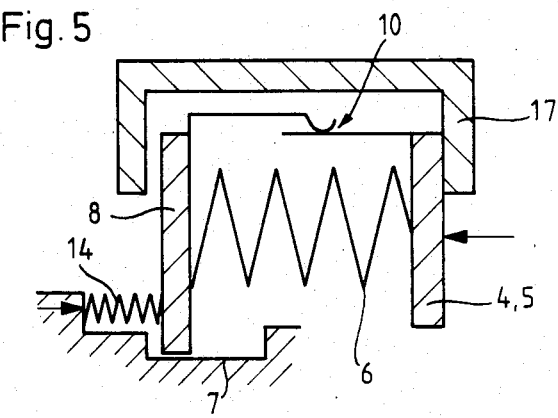
Figure 6:
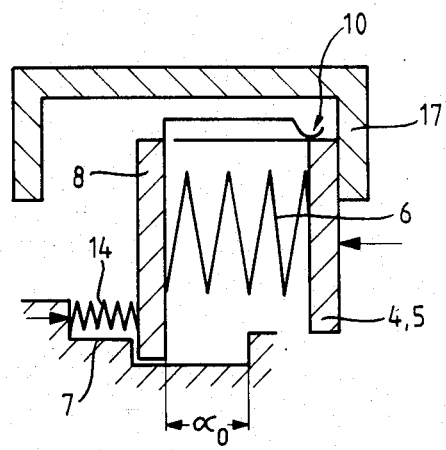

As long as the transmission torque value transmitted by the spring 14 on the spring characteristic curve $C_1$ does not exceed the pre-stress transmission torque value $M_V$ of the torsion spring 6 increased by the frictional torque value $M_R$ of the friction device 10, only the spring 14 is in action. Incidentally, the springs 6 per se (see FIG. 7) are helical compression springs rather than torsion springs. The term "torsion springs" is only used because they resist the torsion between the hub disc on the one hand and the cover plates 4, 5 on the other hand. On exceeding of the sum $M_V+M_R$ the transition takes place to the mixed zone with the spring characteristic curve $C_3$, which has a less steep course than $C_1$ and in the region of which the hub disc 8 lifts away from the bracket 17. By way of example at the point $\overline{5}$ according to FIG. 3 a condition is reached as represented in FIG. 5. On the one hand the spring system with the spring characteristic curve $C_1$ is not yet locked by abutment of the stops, on the other hand the spring 6 is already under loading and the friction device 10 is already effective. In the region of the spring characteristic curve $C_3$ the angle $\alpha_0$ is travelled, which represents an exact measure of the play between the hub 7 and the hub disc 8. The actual abutment between the hub 7 and the hub disc 8 according to FIG. 6 admittedly takes place only when the abutment torque $M_A$ is reached. As from this abutment torque $M_A$ onwards—that is beyond an angular movement $\alpha_0+\Delta\alpha$—only the spring system with the steep spring characteristic curve $C_2$ is effective. The friction device 10 which is also effective in this range is illustrated in FIG. 3 by parallel lines above and below the pure spring characteristic curve. In this case, the upper line is used on increase of torque and angle $\alpha$, while the lower line is travelled on decrease of torque and angle $\alpha$. The points $\overline{6}$ according to FIG. 6 lie on these two lines. During the increase of the torque a curve course has established itself which is similar in principle to that of FIG. 2. On decrease of torque this curve is not maintained. Decrease of torque is represented by the lower line in the region of $C_2$. A larger mixed zone occurs between the angle values $\alpha_{VR1}$ and $\alpha_{VR2}$. This is easily explained by the fact that in the return movement from large angles $\alpha$ towards small angles $\alpha$ the frictional torque $M_R$ acts against the pre-stress torque of the springs 6. Thus while in increase of the angle $\alpha$ the mixed zone commences at the angle $\alpha_{vv}$, the end of the mixed zone on decrease of the angle is only at the angle $\alpha_{vR2}$.

The gradual torque build-up visible especially from FIG. 3 and the correspondingly gradual diminution of the torque result in a torque-angle course which displays very uniform transitions. Thus abutment noises are avoided and at the same time the stimulation of torsional vibrations is suppressed.

Figure 7:
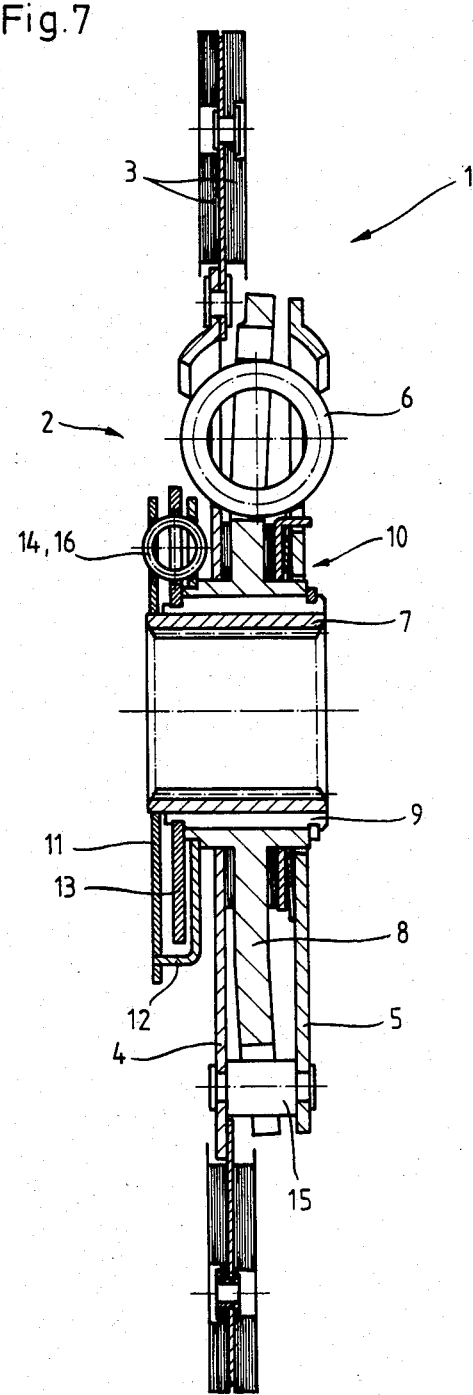
FIG. 7 shows the longitudinal section through a clutch disc with a torsional vibration damper of this invention.
Figure 8:
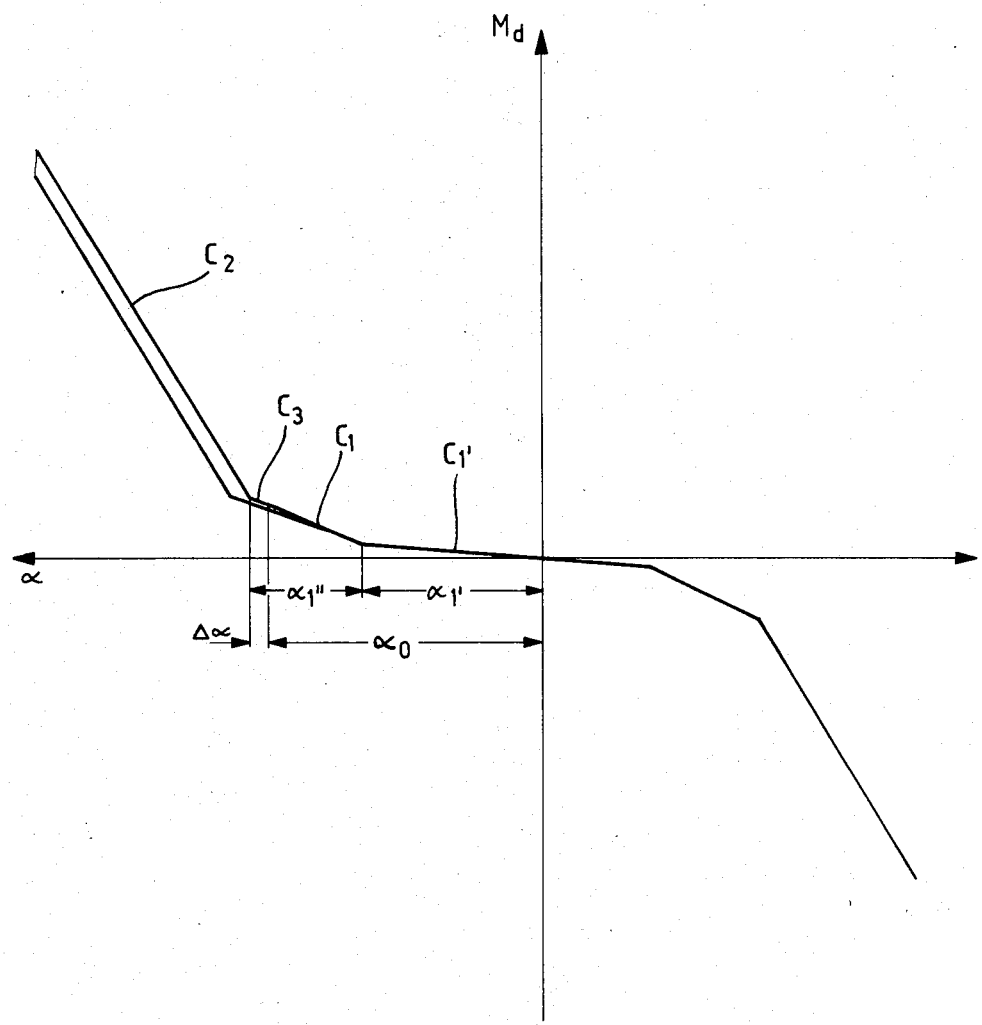
FIG. 8 shows the complete spring characteristic curve according to FIG. 7.

An example of embodiment with its complete characteristic curve is to be discussed again briefly with reference to FIGS. 7 and 8. FIG. 7 shows a clutch disc 1 with a torsional vibration damper 2. The friction linings 3 are firmly connected with a friction lining carrier formed as cover plate 4. A further cover plate 5 is formed as a friction pad carrier and is fast in rotation by means of connecting rivets 15 with the lining carrier 4. Between the cover plates 4, 5 the hub disc 8 is located which engages by toothings 9 with the hub 7, namely with a play corresponding to the angle $\alpha_0$. Torsion springs 6 are arranged between the hub disc 8 and the cover plates 4 and 5. Likewise an ordinary friction device 10 is associated to the torsion springs 6. The torsional vibration damper 2 further comprises a spring system 14, 16 for the idling range. These springs are accomodated by two cover plates 11, 12 fast in rotation with the hub 7 and a hub disc 13 fast in rotation with the hub disc 8. It is here to be noted as a particular feature that the idling system comprises different springs 14 and 16 which come into action in succession. This results in a course of the characteristic curve as represented in FIG. 8. The illustration shows both the traction side and the thrust side, only the traction side being represented with the frictional torque effective there, while the thrust side reproduces only the principle of the course of the spring characteristic curve. Due to the two-stage design of the idling system the spring characteristic $C_{1'}$ is obtained in an angular area $\alpha_{1'}$. Adjacent this angular area $\alpha_{1'}$ all springs of the idling spring system become effective and this results in a steeper spring characteristic curve $C_1$. This steeper spring characteristic curve is effective as long as the transmission torque supplied by the spring system 14, 16 becomes equal to the sum $M_V+M_R$. At this moment the spring system with the steep characteristic curve $C_2$ becomes effective. As a result thereof, one obtains in a mixed zone a spring characteristic curve $C_3$. After an angle $\alpha_0+\Delta\alpha$ or $\alpha_{1'}+\alpha_{1''}$ the hub 7 and the hub disc 8 are locked with respect to each other by the toothing 9. On decrease of the load torque the lower line as shown in the left part of FIG. 8 becomes effective which is displaced with respect to the upper line by 2 $M_R$ as shown in FIG. 3. On the thrust side the same behaviour is possible, however not necessary.

One can see from the preceding examples that the effective angular displacement is increased by the amount $\Delta\alpha$ without increase of the play of the toothing 9. This is a great advantage in view of the narrow constructional situation in the hub disc.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

What is claimed is:

1. A torsional vibration damper, especially for clutch discs of motor vehicles, comprising at least two spring systems (14; 6) with different spring characteristic curves ($C_1$, $C_2$), wherein in the transition from the spring system (14) with the less steep spring characteristic curve ($C_1$) to the spring system (6) with the steeper spring characteristic curve ($C_2$) the system (14) with the less steep spring characteristic curve ($C_1$) is bridged over by stops and at least some torsion springs (6) of the spring system (6) with the steeper spring characteristic curve ($C_2$) are installed under pre-stress, characterized in that the abutment torque ($M_A$) of the spring system (14) with the less steep spring characteristic curve ($C_1$) is made by design greater than the pre-stress transmission torque value ($M_V$) of the spring system (6) with the steeper spring characteristic curve ($C_2$).

2. A torsional vibration damper, especially for clutch discs of motor vehicles, comprising at least two spring systems (14; 6) with differenct spring characteristic curves ($C_1$, $C_2$), wherein in the transition from the spring system (14) with the less steep spring characteristic curve ($C_1$) to the spring system (6) with the steeper spring characteristic curve ($C_2$) the system (14) with the less steep spring characteristic curve ($C_1$) is bridged over by stops and at least some torsion springs (6) of the spring system (6) with the steeper spring characteristic curve ($C_2$) are installed under pre-stress, characterized in that the abutment torque ($M_A$) of the spring system (14) with the less steep characteristic curve ($C_1$) is made by design greater than the pre-stress transmission torque value ($M_V$) of the spring system (6) with the steeper spring characteristic curve ($C_2$), and the spring system (6) with the steeper spring characteristic curve ($C_2$) possesses a parallel-acting friction device (10), characterized in that the abutment torque ($M_A$) of the spring system (14) with the less steep spring characteristic curve ($C_1$) is made by design greater than the sum ($M_{VR}$) of the pre-stress transmission torque value ($M_V$) and frictional torque value ($M_R$) of the spring system (6) with the steeper spring characteristic curve ($C_2$).

3. A torsional vibration damper as set forth in claim 1 or 2, in which a two-part hub (7, 8) is provided and the two parts (7, 8) are connected through a toothing (9) with play in the circumferential direction, while the spring system (14, 16) with the less steep spring characteristic curve ($C_1$, $C_2$) acting as an idling system is effective between the two parts (8, 9) and after the play in the toothing (9) has been bridged over the spring system (6) with the steeper spring characteristic curve acting as an under-load system becomes effective, characterized in that the idling system comprises several torsion springs (14, 16), at least one of which comes additionally into action after a first rotation angle ($\alpha_1'$), and the abutment torque ($M_A$) of the idling system after a second angle ($\alpha_1''$) of rotation is made by design equal to or greater than the sum ($M_{VR}$) of pre-stress transmission torque value ($M_V$) and frictional torque value ($M_R$) of the friction device (10) of the under-load system.

4. A vibration-damped load-transmitting rotor system comprising a first rotor member (7), a second rotor member (8) and a third rotor member (4) rotatable with respect to each other about a common axis of rotation, said first rotor member (7) having a zero-load angular relative position with respect to said second rotor member (8), and said second rotor member (8) having a zero-load relative angular position with respect to said third rotor member (4), cooperating abutment means (9) provided on said first rotor member (7) and said second rotor member (8), said abutment means (9) defining in abutment condition an abutment-defined angular relative position of said first rotor member (7) and said second rotor member (8), first load-transmitting spring means (14) provided between said first rotor member (7) and said second rotor member (8), second load-transmitting spring means (6) provided between said second rotor member (8) and said third rotor member (4), said second load transmitting spring means (6) being pre-stressed such as to supply a pre-stress transmission torque value ($M_V$) in said zero-load relative angular position of said second rotor member (8) and said third rotor member (4), said first load-transmitting spring means (14) supplying an increasing transmission torque in response to said first and said second rotor members (7, 8) approaching said abutment-defined angular relative position under a circumferential load applied to said first and said third rotor members (7, 4), said second load-transmitting spring means (6) supplying an increasing transmission torque beyond said pre-stress transmission torque value ($M_V$) in response to said second and third rotor members (8, 4) being rotated with respect to each other beyond their zero-load relative angular position under a circumferential load applied to said first (7) and said third (4) rotor members, the increase of transmission torque ($M_d$) per unit of angular movement ($\alpha$) of the respective rotor members (7, 8, 4) being smaller for said first load-transmitting spring means (14) than for said second load-transmitting spring means (6), said transmission torque supplied by said load-transmitting first spring means (14) becoming equal to said pre-stress transmission torque value ($M_V$) before said abutment means (9) enter into abutting condition.

5. A vibration-damped load-transmitting rotor system, comprising a first rotor member (7), a second rotor member (8) and a third rotor member (4) rotatable with respect to each other about a common axis of rotation, said first rotor member (7) having a zero-load angular relative position with respect to said second rotor member (8), and said second rotor member (8) having a zero-load relative angular position with respect to said third rotor member (4), cooperating abutment means (9) provided on said first rotor member (7) and said second rotor member (8), said abutment means (9) defining in abutment condition an abutment-defined angular relative position of said first rotor member (7) and said second rotor member (8), first load-transmitting spring means (14) provided between said first rotor member (7) and said second rotor member (8), second load-transmitting spring means (6) provided between said second rotor member (8) and said third rotor member (4), said second load transmitting spring means (6) being pre-stressed such as to supply a pre-stress transmission torque value ($M_V$) in said zero-load relative angular position of said second rotor member (8) and said third rotor member (4), said first load-transmitting spring means (14) supplying an increasing transmission torque in response to said first and said second rotor members (7, 8) approaching said abutment-defined angular relative position under a circumferential load applied to said first and said third rotor members (7, 4), said second load-transmitting spring means (6) supplying an increasing transmission torque beyond said pre-stress transmission torque value ($M_V$) in response to said second and third rotor members (8, 4) being rotated with respect to each other beyong their zero-load relative angular position under a circumferential load applied to said first (7) and said third (4) rotor members, the increase of transmission torque ($M_d$) per unit of angular movement ($\alpha$) of the respective rotor members (7, 8, 4) being smaller for said first load-transmitting spring means (14) than for said second load-transmitting spring means (6), said transmission torque supplied by said load transmitting first spring means (14) becoming equal to said pre-stress transmission torque value ($M_V$) before said abutment means (9) enter into abutting condition, cooperating frictional damping means (10) being provided on said second rotor member (8) and said third rotor member (4), said frictional damping means (10) supplying a frictional torque value ($M_R$) resisting to relative angular movement of said second (8) and said third (4) rotor members, said transmission torque supplied by said first load-transmitting spring means (14) becoming equal to the sum ($M_{VR}$) of said pre-stress transmission torque value ($M_V$) and said frictional torque value ($M_R$) before said abutment means (9) enter into abutting condition.

6. A rotor system as set forth in claim 4,
said first load-transmitting spring means (14, 16) comprising at least two spring units (14, 16), one (16) of said spring units (14, 16) being stressed only in a section ($\alpha_{1''}$) of angular relative movement of said first rotor member (7) and said second rotor member (8), which section ($\alpha_{1''}$) is angularly spaced from said zero-load relative angular position towards said abutment-defined angular relative position of said first (7) and said second (8) rotor members.

7. A rotor system as set forth in claim 4, said first rotor member (7) being a primary hub member (7) of a clutch disc unit, said second rotor member (8) being a secondary hub member (8) of said clutch disc unit, said third rotor member (4) being a friction lining carrier (4) of said clutch disc unit, said abutment means (9) being defined by toothings (9) of said primary hub member (7) and said secondary hub member (8), which toothings (9) permit a circumferential play of said primary hub member (7) and said secondary hub member (8).

8. A rotor system as set forth in claim 4, said transmission torque of said load-transmitting first spring means (14) becoming equal to said pre-stress transmission torque value ($M_V$) at an angular relative distance from said abutment-defined angular relative position which is at least 20% of the angular distance between said zero-load relative angular position and said abutment-defined angular relative position.

* * * * *